United States Patent
Uchida

[19]

[11] Patent Number: 5,861,735
[45] Date of Patent: Jan. 19, 1999

[54] SWITCHING POWER SUPPLY CIRCUIT

[75] Inventor: Takahito Uchida, Tokyo, Japan

[73] Assignee: NEC Corporation, Tokyo, Japan

[21] Appl. No.: 27,151

[22] Filed: Feb. 20, 1998

[30]     Foreign Application Priority Data

Feb. 27, 1997  [JP]  Japan .................................. 9-044034

[51] Int. Cl.⁶ ...................................................... G05F 1/40
[52] U.S. Cl. ........................................... 323/271; 323/268
[58] Field of Search ..................................... 323/265, 268,
                323/271, 282, 285, 222, 223, 224, 349,
                350, 351

[56]           References Cited

U.S. PATENT DOCUMENTS

| 4,940,929 | 7/1990 | Williams | 323/222 |
| 4,959,606 | 9/1990 | Forge | 323/286 |
| 5,532,918 | 7/1996 | Mayrand et al. | 363/89 |
| 5,592,072 | 1/1997 | Brown | 323/268 |
| 5,726,845 | 3/1998 | Ho | 361/86 |
| 5,747,976 | 5/1998 | Wong et al. | 323/282 |
| 5,777,462 | 7/1998 | Yue | 323/285 |

FOREIGN PATENT DOCUMENTS 720368  3/1995  Japan .

Primary Examiner—Adolf Berhane

[57]          ABSTRACT

Switching power supply circuit of the invention is provided with an nMOS transistor (Q1) and a pMOS transistor (Q2) connected in parallel inversely for switching an input DC voltage, and a driving circuit (3) for switching the nMOS transistor (Q1) when the duty-cycle is small and the pMOS transistor (Q2) when the duty-cycle becomes large. Therefore a stable output voltage can be obtained through the pMOS transistor (Q2) against fall of the input DC voltage supplied from a battery until its available limit determined by on-resistance of the pMOS transistor (Q2), while the stable output voltage can be obtained with minimum driving loss through the nMOS transistor (Q1) having smaller input parasitic capacitance compared to the pMOS transistor (Q2), when the input DC voltage is sufficiently high.

4 Claims, 4 Drawing Sheets

103 : DRIVE CIRCUIT

SWITCHING POWER SUPPLY CIRCUIT

BACKGROUND OF THE INVENTION

The present invention relates to a switching power supply circuit, and particularly to that to be applied to a power supply circuit of a portable OA (Office Automation) equipment such as a laptop personal computer.

Portable OA equipment such as a laptop computer driven with a battery is widely used, wherein a voltage regulator is used for generating necessary DC voltages, ±5V or ±12V, for example, being supplied from the battery having a normal voltage 8 to 16V. As to the voltage regulator, a switching power supply circuit is generally used in order to satisfy both the high conversion efficiency and the miniaturization required for the portable equipment.

FIG. 4 is a block diagram illustrating a prior example of the switching power supply circuit disclosed in a Japanese patent published with a Specification No. 20368/'95, comprising a drive circuit 103, a constant voltage circuit 1 for supplying a constant voltage Vb to the drive circuit 103, a control circuit 102 for generating a pulse signal used in the drive circuit 103 for determining duty-cycle of the switching operation, an nMOS (n-type Metal Oxide Semiconductor) transistor Q1 with its gate controlled by the drive circuit 103 for switching an input DC voltage VIN to be output as a switched voltage Va, and a LPF (Low-Pass Filter) having a diode D2, a choke inductor L1 and a capacitor C2 for obtaining an output voltage VO by smoothing the switched voltage Va.

For efficiently switching the input DC voltage VIN, gate of the nMOS transistor Q1 should be controlled with ON voltage sufficiently high to its source voltage (=switched voltage) Va. For the purpose, the drive circuit 103 is provided in the prior art.

The drive circuit 103 comprises transistors Q11, Q12, Q14 and Q15, a diode D1 for preventing backward current, and a booster capacitor C1 connected to the gate of the nMOS transistor Q1.

The constant voltage circuit 1 outputs a constant DC voltage Vb, which charges an electrode, connected to collector of the transistor Q11, of the capacitor C1 through the diode D1 to a charged voltage Vc, when potential of another electrode of the capacitor C1 is lower than the constant voltage Vb coupled to the ground level GND through gate capacitance of the nMOS transistor Q1 at status OFF.

When the transistor Q11 of the drive circuit 103 is controlled to be ON, the charged voltage Vc is impressed to the gate of the nMOS transistor Q1 and turns ON the nMOS transistor Q1, raising up the switched voltage Va. When the switched voltage is raised up, it pushes up the charged voltage Vc, that is, the gate voltage of the nMOS transistor Q1 through the gate capacitance.

Thus, the nMOS transistor Q1 is sufficiently driven by the charged voltage Vc thus pushed up.

However, the capacitor C1 is charged in intervals when the nMOS transistor Q1 is at status OFF. Hence, it can not be charged sufficiently when duty-cycle of the switching operation becomes high according to fall of the input DC voltage VIN because of discharge of the battery supplying the input DC voltage VIN, resulting in insufficient gate voltage for driving the nMOS transistor Q1, which limits available life of the battery before the duty-cycle approaches to 100%.

Furthermore, although higher switching frequency is more preferable for miniaturization of the switching regulator, the above phenomenon means that the minimum operational voltage of the input DC voltage VIN also becomes higher for securing necessary charge to drive the nMOS transistor Q1, when the switching frequency is made higher, making the available battery life still shorter.

SUMMARY OF THE INVENTION

Therefore, a primary object of the present invention is to provide a switching power supply circuit which can stably maintain output voltage until the input voltage falls to its limit, with a simple and small configuration able to be driven with a high switching frequency.

In order to achieve the object, a switching power supply circuit of the invention; comprising an nMOS transistor for generating a switched voltage by switching an input DC voltage, a drive circuit for obtaining a first gate control signal to drive the nMOS transistor according to pulse width of a switching pulse signal, a pulse width modulation circuit for generating the switching pulse signal, a constant voltage circuit supplied with the input DC voltage for supplying a constant voltage to the drive circuit, and a smoothing circuit for obtaining an output DC voltage by smoothing the switched voltage; further comprises:

a pMOS transistor connected in parallel to the nMOS transistor inversely;

a duty-cycle detector circuit for obtaining a duty signal whereof logic turns when a duty-cycle of the switching pulse signal becomes larger than a fixed value;

a first logic circuit for making the first gate control signal inactive according to the duty signal when the duty-cycle of the switching pulse signal becomes larger than the fixed value; and a second logic circuit for driving the pMOS transistor according to inverse logic of the switching pulse signal.

Therefore, a stable output voltage can be obtained through the pMOS transistor against fall of the input DC voltage supplied from a battery until its available limit determined by on-resistance of the pMOS transistor, while the stable output voltage can be obtained with minimum driving loss through the nMOS transistor having smaller input parasitic capacitance compared to the pMOS transistor, when the input DC voltage is sufficiently high, in the switching power supply circuit of the invention.

BRIEF DESCRIPTION OF THE DRAWINGS

The foregoing, further objects, features, and advantages of this invention will become apparent from a consideration of the following description, the appended claims, and the accompanying drawings wherein the same numerals indicate the same or the corresponding parts.

In the drawings.

DETAILED DESCRIPTION OF THE PREFERRED EMBODIMENTS

Now, embodiments of the present invention will be described in connection with the drawings.

Figure 1:
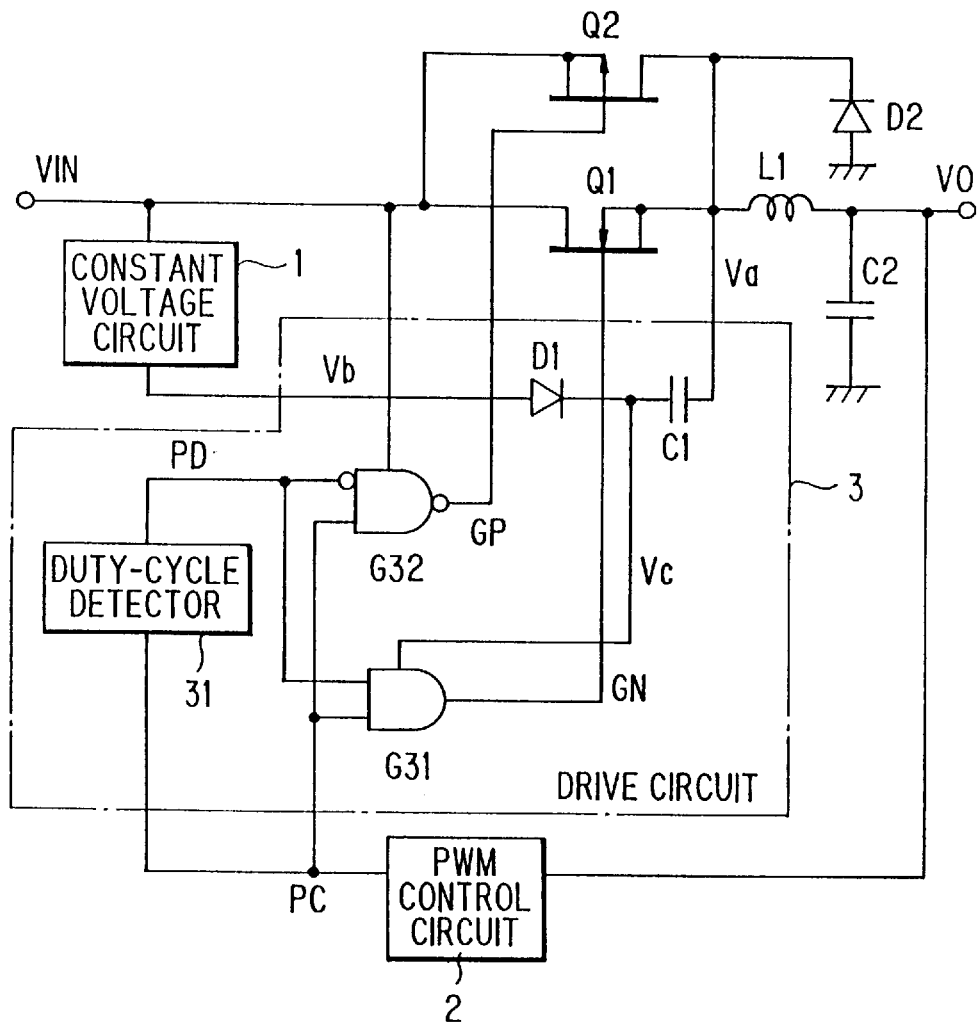
FIG. 1 is a circuit diagram illustrating a switching power supply circuit according to a first embodiment of the invention.

FIG. 1 is a circuit diagram illustrating a switching power supply circuit according to a first embodiment of the invention.

Figure 4:
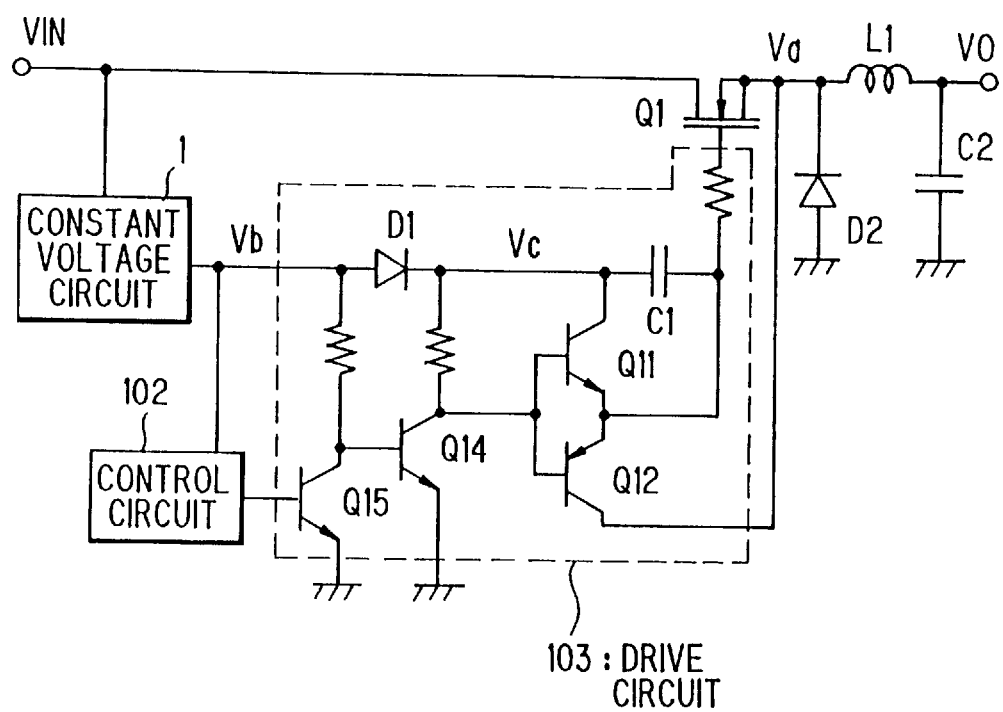
FIG. 4 is a block diagram illustrating a prior example of the switching power supply circuit.

The switching power supply circuit of FIG. 1 comprises a pMOS transistor Q2, in addition to the constant voltage circuit 1 for supplying the constant voltage Vb, the nMOS transistor Q1 for switching the input DC voltage VIN to be output as the switched voltage Va, and the LPF having the diode D2, the choke inductor L1 and the capacitor C2 for obtaining the output voltage VO by smoothing the switched voltage Va, of the prior art switching power supply circuit of FIG. 4.

Furthermore, the drive circuit 103 and the control circuit 102 of FIG. 4 are replaced with a drive circuit 3 and a PWM (Pulse Width Modulation) control circuit 2, respectively, in the embodiment of FIG. 1.

Source of the pMOS transistor Q2 is supplied with the input DC voltage VIN together with drain of the nMOS transistor Q1, and drain of the pMOS transistor is connected to the choke inductor L1 of the LPF for outputting the switched voltage Va together with source of the nMOS transistor Q1.

The drive circuit 3 has the diode D1 for preventing backward current, and the booster capacitor C1 connected between the diode D1 and the source of the nMOS transistor Q1 to be charged with the constant voltage Vb, in a similar way with the switching power supply circuit of FIG. 4.

In place of the transistors Q11, Q12, Q14 and Q15 of FIG. 4, the drive circuit 3 comprises;

a duty-cycle detector 31 for outputting a duty signal PD, output logic thereof according to duty-cycle level (high/low) of a switching pulse signal PC generated by the PWM control circuit 2, an AND gate G31 supplied with the charged voltage Vc for outputting an nMOS gate control signal GN, which has a HIGH level of the charged voltage Vc according to AND logic of the duty signal PD and the switching pulse signal PC; and a NAND gate G32 supplied with the input DC voltage VIN for outputting a pMOS gate control signal GP, which has a HIGH level of the input DC voltage VIN according to NAND logic of the switching pulse signal PC and inverse logic of the duty signal PD.

Figure 2A:
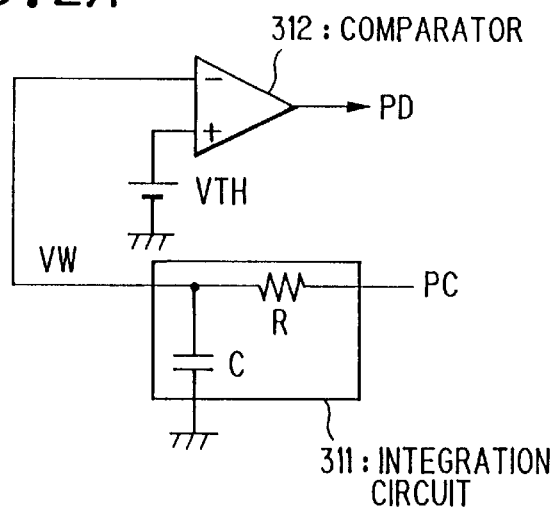
FIG. 2A is a circuit diagram illustrating a configuration of the duty-cycle detector 31 of FIG. 1.

FIG. 2A is a circuit diagram illustrating a configuration of the duty-cycle detector 31, comprising an integration circuit 311 composed of an RC low-pass filter for outputting an integration voltage VW by integrating the switching pulse signal PC, and a comparator 312 for outputting the duty signal PD by comparing the integration voltage VW to a threshold voltage VTH.

Now, operation of the embodiment is described referring to FIG. 1 and FIGS. 2A to 2C.

The constant voltage circuit 1 generates the constant voltage Vb sufficiently high for driving the nMOS transistor Q1. The PWM control circuit 2 generate the switching pulse signal PC having a pulse width controlled according to the output voltage VO, which is delivered to the AND gate G31, the NAND gate G32 and the duty-cycle detector 31.

Figure 2B:
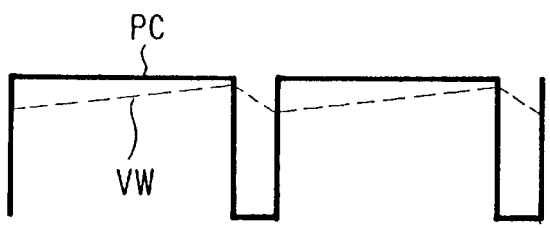
FIGS. 2B and 2C are graphic charts illustrating operation of the duty-cycle detector 31.
Figure 2C:
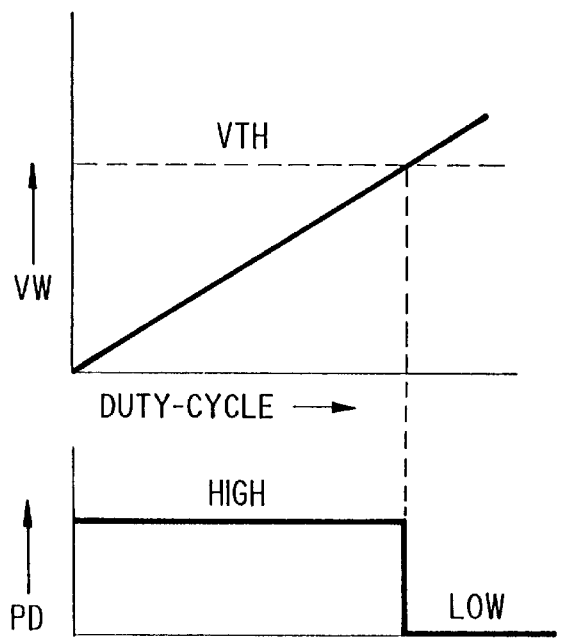

FIGS. 2B and 2C are graphic charts illustrating operation of the duty-cycle detector 31. When the input DC voltage VIN is sufficiently high, the duty-cycle, which is defined as a pulse width (ON interval of each pulse) multiplied by switching frequency of the switching pulse signal PC, is controlled to be small, and the integration voltage VW output from the integration circuit 311 in proportion to the duty-cycle becomes lower than the threshold voltage VTH. Hence, the duty signal PD output from the comparator 312 is maintained at HIGH level, making the NAND gate G32 closed. Therefore, the pMOS gate control signal GP is maintained at HIGH level and the pMOS transistor Q2 remains to be OFF, while the AND gate G31 is controlled to be open and outputs the nMOS gate control signal GN having the same pulse width with the switching pulse signal PC.

When OFF interval of the nMOS transistor Q1 becomes short, on the other hand, according to fall of the input DC voltage VIN, that is, when the duty-cycle becomes large as illustrated in FIG. 2B, the integrated voltage VW becomes high. When the integrated voltage VW becomes higher than the threshold voltage, status of the comparator 312 turns and the duty signal PD turns to LOW making the NAND gate G32 open, so that the pMOS transistor Q2 becomes to be driven with inverted logic of the switching pulse signal PC. The nMOS transistor Q1 is controlled to be OFF at the same time with the nMOS gate control signal GN which is made at logic LOW by the AND gate G1 closed, as shown in FIG. 2C.

The AND gate G31 is driven with a charged voltage Vc which is chaged in the capacitor C1 with the constant voltage Vb during the nMOS transistor is OFF and pushed up with its source potential when the nMOS transistor Q1 is turned to ON, when the duty signal PD is at HIGH level. Therefore, gate of the nMOS transistor Q1 is supplied with the nMOS gate control signal GN having sufficient voltage difference to its source, when the duty-cycle is small. When the duty-cycle becomes large, the NAND gate G32 becomes to drive the gate of the pMOS transistor Q2 with a ground voltage having voltage difference of the input DC voltage VIN to its source potential.

Thus, either the nMOS transistor Q1 or the pMOS transistor Q2 is driven with their on-resistance sufficiently low, enabling to supply the output voltage VO stably against fall-down of the input DC voltage VIN until available limit of the battery supplying it, in the embodiment.

Now, a second embodiment of the present invention will be described referring to FIG. 3. The switching power supply circuit according to the second embodiment illustrated in a circuit diagram of FIG. 3 comprises a drive circuit 3A in place of the drive circuit 3 and the constant voltage circuit 1 of FIG. 1.

Figure 3:
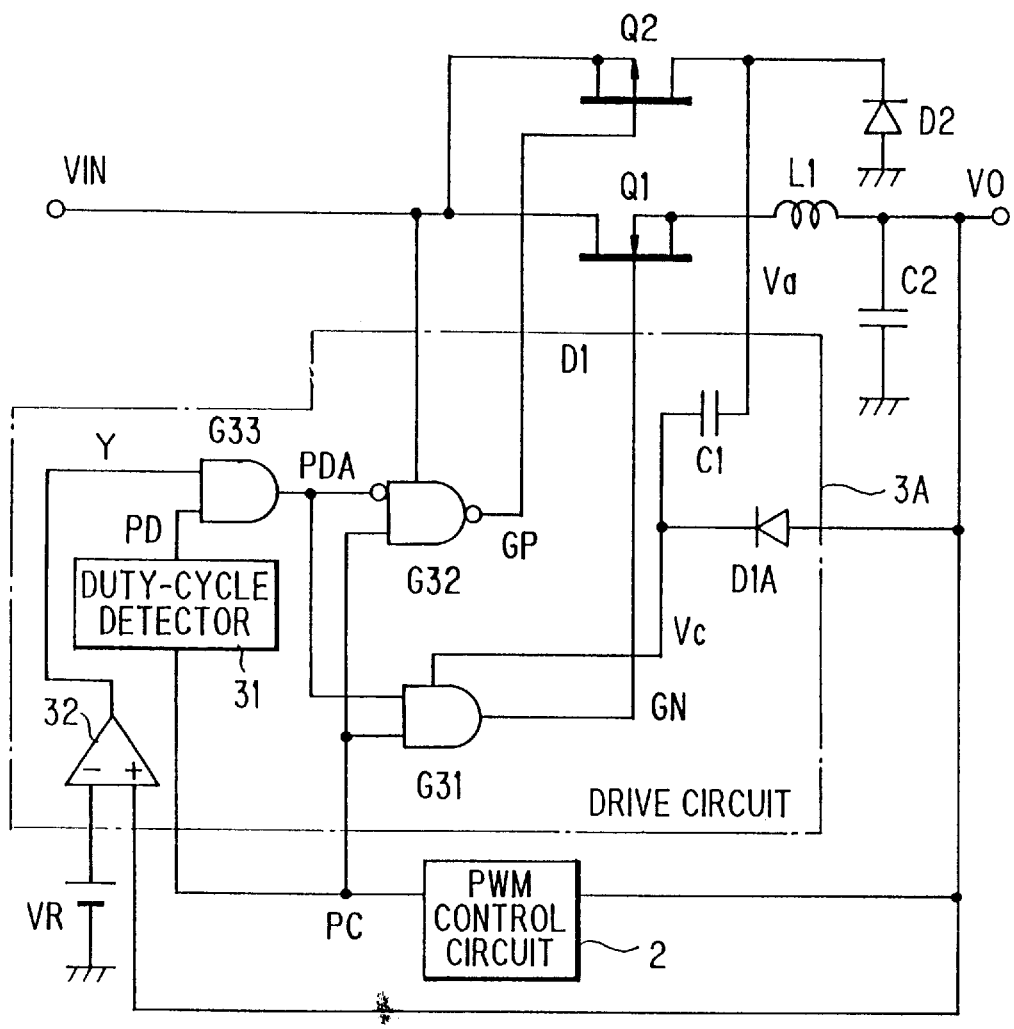
FIG. 3 is a circuit diagram illustrating a switching power supply circuit according to a second embodiment of the invention.

Compared to the drive circuit 3 of FIG. 1, the drive circuit 3A of FIG. 3 further comprises;

a diode D1A with its anode connected to the output voltage VO for charging the capacitor C1 instead of the diode D1 of FIG. 1, a comparator 32 for obtaining an output detecting signal Y by comparing the output voltage VO to a reference voltage VR, a second AND gate G33 for outputting AND logic PDA of the duty signal PD and the output detecting signal Y.

In the second embodiment, the output voltage VO is used for charging the capacitor C1. Therefore, when the duty-cycle is intentionally limited within a value for soft-starting the switching power supply circuit at its rising-up, the duty-cycle detector 31 might drive the nMOS transistor Q1; not driving the pMOS transistor Q2, detecting the long OFF interval, which causes insufficient gate voltage of the nMOS transistor Q1 because of lack of the output voltage VO not yet raised up. This is why the comparator 31 and the second AND gate G33 are provided for driving the pMOS transistor Q2 instead of the nMOS transistor Q1 when the output voltage is low even if the duty-cycle is small.

Detecting the output voltage VO attains to a sufficient voltage for driving the nMOS transistor Q1, the second AND gate G33 makes valid the duty signal PD for changing over the control from the pMOS transistor Q2 to the nMOS transistor Q1.

In the second embodiment, it is not necessary to provide the constant voltage circuit 1 for driving the nMOS transistor Q1, enabling further miniaturization and cost-reduction of the portable equipment.

As heretofore described, by providing an nMOS transistor and a pMOS transistor connected in parallel inversely as the switching device, and a driving circuit for switching the nMOS transistor when the duty-cycle is small and the pMOS transistor when the duty-cycle becomes large, a stable output voltage can be obtained through the pMOS transistor against fall of input dc voltage supplied from a battery until its available limit determined by on-resistance of the pMOS transistor, while the stable output voltage can be obtained with minimum driving loss through the nMOS transistor having smaller input parasitic capacitance compared to the pMOS transistor, when the input DC voltage is sufficiently high, in the switching power supply circuit of the invention.

What is claimed is:

1. A switching power supply circuit having a first conductivity type transistor for generating a switched voltage by switching an input DC voltage, a drive circuit for obtaining a first gate control signal to drive the first conductivity type transistor according to pulse width of a switching pulse signal, a pulse width modulation circuit for generating the switching pulse signal, a constant voltage circuit supplied with the input DC voltage for supplying a constant voltage to the drive circuit, and a smoothing circuit for obtaining an output DC voltage by smoothing the switched voltage; said switching power supply circuit further comprising:

a second conductivity type transistor connected in parallel to the first conductivity type transistor inversely;

a duty-cycle detector circuit for obtaining a duty signal whereof logic turns when a duty-cycle of the switching pulse signal becomes larger than a fixed value;

a first logic circuit for making the first gate control signal inactive according to the duty signal when the duty-cycle of the switching pulse signal becomes larger than the fixed value; and a second logic circuit for driving the second conductivity type transistor according to inverse logic of the switching pulse signal when the duty-cycle of the switching pulse signal becomes larger than the fixed value.

2. The switching power supply circuit recited in claim 1; said duty-cycle detector circuit comprising:

an integration circuit for obtaining an integration voltage by low-pass filtering the switching pulse signal; and a comparator for turning logic of the duty signal according to comparison result of the integration voltage to a predetermined threshold voltage representing the fixed value.

3. The switching power supply circuit recited in claim 1; comprising a capacitor for charging the constant voltage between an output terminal of the constant voltage circuit and an input node of the smoothing circuit.

4. The switching power supply circuit recited in claim 1; further comprising:

a comparator for obtaining an output detecting signal by compareing the output DC voltage with a predetermined reference voltage; and a third logic circuit controlled by the output detecting signal to be open for supplying the duty signal to the first and the second logic circuit when the output DC voltage is not smaller than the predetermined reference voltage.

* * * * *